US010140323B2

(12) United States Patent
Liu et al.

(10) Patent No.: US 10,140,323 B2
(45) Date of Patent: Nov. 27, 2018

(54) DATA MODEL INDEXING FOR MODEL QUERIES

(71) Applicant: Microsoft Technology Licensing, LLC, Redmond, WA (US)

(72) Inventors: Zhen Liu, Tarrytown, NY (US); Chiu Chun Bobby Mak, Beijing (CN); Xiaomin Deng, Beijing (CN); Yet Luong Huynh, Beijing (CN); Ning Wang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 962 days.

(21) Appl. No.: 14/549,463

(22) Filed: Nov. 20, 2014

(65) Prior Publication Data

US 2016/0019246 A1    Jan. 21, 2016

Related U.S. Application Data

(63) Continuation of application No. PCT/CN2014/082210, filed on Jul. 15, 2014.

(51) Int. Cl.
*G06F 7/00* (2006.01)
*G06F 17/30* (2006.01)

(52) U.S. Cl.
CPC .. *G06F 17/30321* (2013.01); *G06F 17/30457* (2013.01)

(58) Field of Classification Search
CPC ............... G06F 17/30321; G06F 17/30457
USPC ....................................................... 707/722
See application file for complete search history.

(56) References Cited

U.S. PATENT DOCUMENTS

| 5,550,971 | A  | 8/1996  | Brunner et al.   |
|-----------|----|---------|------------------|
| 5,713,014 | A  | 1/1998  | Durflinger et al.|
| 5,842,212 | A  | 11/1998 | Ballurio et al.  |
| 6,199,195 | B1 | 3/2001  | Goodwin et al.   |
| 6,493,719 | B1 | 12/2002 | Booth et al.     |
| 6,560,592 | B1 | 5/2003  | Reid et al.      |

(Continued)

FOREIGN PATENT DOCUMENTS

| CN | 101079736 A | 11/2007 |
|----|-------------|---------|
| CN | 101617290 A | 12/2009 |

(Continued)

OTHER PUBLICATIONS

Extended European Search Report issued in European Application No. EP109779RK, dated Nov. 8, 2017.

(Continued)

*Primary Examiner* — Binh V Ho
(74) *Attorney, Agent, or Firm* — Workman Nydegger

(57) ABSTRACT

The use of a data model index for assisting in efficient response to a data model query. The data model query identifies the data model itself and references the schema of the data model, rather than referencing the schema of the underlying data source. The index assists by correlating previous model queries on the data model and associated response to those previous model queries. Accordingly, if a similar model query is encountered, the response from the previous model query may still be considered fresh, the index may be used to more efficiently retrieve the results for the similar model query. A data management system may include multiple data models, each having a corresponding data model index.

14 Claims, 7 Drawing Sheets

(56) References Cited

U.S. PATENT DOCUMENTS

| | | |
|---|---|---|
| 6,785,689 B1 | 8/2004 | Daniel et al. |
| 7,085,757 B2 | 8/2006 | Dettinger et al. |
| 7,185,317 B2 | 2/2007 | Fish et al. |
| 7,359,906 B1 | 4/2008 | Hargett et al. |
| 7,533,107 B2 | 5/2009 | Gupta et al. |
| 7,730,056 B2 | 6/2010 | Kaiser et al. |
| 7,849,065 B2 | 12/2010 | Kamani et al. |
| 7,849,104 B2 | 12/2010 | Sun et al. |
| 7,895,568 B1 | 2/2011 | Goodwin et al. |
| 7,899,837 B2* | 3/2011 | Polo-Malouvier ........................ G06F 17/30398 707/759 |
| 7,949,654 B2 | 5/2011 | Das et al. |
| 8,346,811 B2 | 1/2013 | Wyatt et al. |
| 8,352,432 B2 | 1/2013 | Prahlad et al. |
| 8,442,982 B2 | 5/2013 | Jacobson et al. |
| 8,510,732 B2 | 8/2013 | Chevrette et al. |
| 8,577,927 B2 | 11/2013 | Fabret et al. |
| 8,838,654 B1 | 9/2014 | Hannah et al. |
| 9,298,857 B2 | 3/2016 | Mineno |
| 2002/0107840 A1 | 8/2002 | Rishe |
| 2002/0133504 A1 | 9/2002 | Vlahos et al. |
| 2003/0046292 A1 | 3/2003 | Subramanian et al. |
| 2003/0115035 A1* | 6/2003 | Kulshreshtha ....... G06F 17/5022 703/19 |
| 2003/0154191 A1 | 8/2003 | Fish et al. |
| 2003/0172368 A1 | 9/2003 | Alumbaugh et al. |
| 2003/0191727 A1* | 10/2003 | Yao ................... G06F 17/30539 706/20 |
| 2004/0230571 A1 | 1/2004 | Robertson |
| 2004/0083199 A1 | 4/2004 | Govindugari et al. |
| 2005/0091249 A1 | 4/2005 | Hanson et al. |
| 2005/0102538 A1 | 5/2005 | Hunt et al. |
| 2005/0149552 A1 | 7/2005 | Chan et al. |
| 2005/0234889 A1 | 10/2005 | Fox et al. |
| 2005/0289174 A1 | 12/2005 | Kolli et al. |
| 2006/0089941 A1 | 4/2006 | Jenni et al. |
| 2006/0172906 A1 | 8/2006 | Wu et al. |
| 2006/0173906 A1* | 8/2006 | Chu .................. G06F 17/30321 |
| 2006/0271885 A1 | 11/2006 | Pittendrigh et al. |
| 2006/0277224 A1 | 12/2006 | Aftab et al. |
| 2006/0282470 A1 | 12/2006 | Yu et al. |
| 2006/0287899 A1* | 12/2006 | Balmelli ................. G06F 17/50 705/70 |
| 2006/0294181 A1 | 12/2006 | Barzacanos et al. |
| 2007/0114279 A1 | 5/2007 | Lessing et al. |
| 2007/0118540 A1 | 5/2007 | Guo |
| 2007/0240109 A1 | 10/2007 | Chandra et al. |
| 2007/0299858 A1 | 12/2007 | Norcott |
| 2008/0077598 A1 | 3/2008 | Wilmering et al. |
| 2008/0154745 A1 | 6/2008 | Chan et al. |
| 2008/0288510 A1 | 11/2008 | Bloesch |
| 2008/0320012 A1 | 12/2008 | Loving et al. |
| 2010/0004603 A1 | 1/2010 | Kristensen et al. |
| 2010/0063880 A1 | 3/2010 | Atsmon et al. |
| 2010/0076947 A1 | 3/2010 | Kurapat et al. |
| 2011/0282861 A1 | 11/2011 | Bergstraesser et al. |
| 2012/0078877 A1 | 3/2012 | Copperman |
| 2012/0110021 A1* | 5/2012 | Hryniewicki ..... G06F 17/30294 707/790 |
| 2012/0260265 A1 | 10/2012 | Doganata et al. |
| 2013/0080349 A1 | 3/2013 | Bhola et al. |
| 2013/0254199 A1 | 9/2013 | Surendran et al. |
| 2014/0013297 A1 | 1/2014 | Cook et al. |
| 2014/0040533 A1 | 2/2014 | Huang et al. |
| 2014/0046936 A1 | 2/2014 | John |
| 2014/0149369 A1 | 5/2014 | Fan et al. |
| 2014/0324472 A1* | 10/2014 | Delaney ................. G16H 10/60 705/3 |
| 2015/0142836 A1* | 5/2015 | Borges .............. G06F 17/30569 707/756 |
| 2015/0347621 A1 | 12/2015 | Hu et al. |
| 2016/0055225 A1* | 2/2016 | Xu ..................... G06F 17/30575 707/624 |
| 2016/0171511 A1* | 6/2016 | Goel ...................... G06Q 50/01 705/7.29 |

FOREIGN PATENT DOCUMENTS

| | | |
|---|---|---|
| CN | 101794315 A | 8/2010 |
| CN | 101808109 | 8/2010 |
| CN | 101916299 A | 12/2010 |
| CN | 105138526 A | 12/2015 |
| EP | 0838771 | 4/1998 |
| EP | 1081611 A2 | 3/2001 |

OTHER PUBLICATIONS

International Preliminary Report on Patentability issued in PCT Application No. PCT/CN2014/082210, dated Jan. 26, 2017.

International Preliminary Report on Patentability issued in PCT Application No. PCT/CN2014/082209 dated Jan. 26, 2017.

International Preliminary Report on Patentability issued in PCT Application No. PCT/CN2014/082213 dated Jan. 26, 2017.

"International Search Report & Written Opinion Received for PCT Patent Application No. PCT/CN2014/082210", dated Apr. 20, 2015, 13 Pages.

Office Action issued in U.S. Appl. No. 14/459,452 dated Sep. 12, 2017.

Office Action issued in U.S. Appl. No. 14/459,123 dated Sep. 21, 2017.

Office Action issued in U.S. Appl. No. 14/549,468 dated Sep. 21, 2017.

Braunschweig, et al., "A flexible graph-based data model supporting incremental schema design and evolution Services", In Proceedings of the 11th international conference on Current Trends in Web Engineering, Jun. 20, 2011, 2 pages.

Zaman, et al., "Information Integration for Heterogeneous Data Sources Services", In Proceedings of IOSR Journal of Engineering, vol. 2 No. 4, Apr. 2012, 4 pages.

Dong, et al., "Indexing Dataspaces", In Proceedings of ACM SIGMOD International Conference on Management of Data, Jun. 12, 2007, pp. 43-54.

Stuckenschmidt, et al., "Exploring Large Document Repositories with RDF Technology: The DOPE Project", In IEEE Intelligent Systems, vol. 19, Issue 3, May 2004, pp. 34-40.

Branson, et al., "A Data Model for Integrating Heterogeneous Medical Data in the Health-e-Child Project", In Proceedings of Studies in Health Technology and Informatics, Jun. 16, 2014, 10 pages.

Hema, et al., "Service Oriented Ontology Based Data Federation for Heterogeneous Data Sources", In Journal of Theoretical and Applied Information Technology, vol. 55, No. 1, Sep. 10, 2013, pp. 126-136.

Chirathamjaree, Chaiyaporn., "A Data Model for Heterogeneous Data Sources", In IEEE International Conference on e-Business Engineering, Oct. 22, 2008, pp. 121-127.

Smit, et al., "A Unified Representation for the Model-based Visualization of Heterogeneous Anatomy Data", In Proceedings of Eurographics Conference on Visualization, Jul. 15, 2014, 5 pages.

U.S. Appl. No. 14/549,452, filed Nov. 20, 2014, Liu, et al.

U.S. Appl. No. 14/550,123, filed Nov. 21, 2014, Liu, et al.

U.S. Appl. No. 14/549,468, filed Nov. 20, 2014, Liu, et al.

"International Search Report and Written Opinion Issued for PCT Patent Application No. PCT/CN2014/082209", dated Mar. 27, 2015, 11 pages.

"International Search Report and Written Opinion Issued in PCT Application No. PCT/CN2014/082212", dated Mar. 27, 2015, 12 pages.

"International Search Report and Written Opinion Issued in PCT Patent Application No. PCT/CN2014/082213", dated Apr. 29, 2015, 14 pages.

"Search Report Issued in European Patent Application No. 14897860.4", dated Nov. 8, 2017, 7 Pages.

(56) References Cited

OTHER PUBLICATIONS

"Final Office Action Issued in U.S. Appl. No. 14/549,452", dated Apr. 19, 2018, 28 Pages.
"Notice of Allowance Issued in U.S. Appl. No. 14/549,468", dated Apr. 23, 2018, 8 Pages.
"Final Office Action Issued in U.S. Appl. No. 14/550,123", dated Apr. 19, 2018, 6 Pages.
"Office Action Issued in European Patent Application No. 14897734.1", dated Mar. 5, 2018, 7 Pages.
"First Office Action and Search Report Issued in Chinese Patent Application No. 201480048972.6", dated Apr. 4, 2018, 12 Pages.
"First Office Action and Search Report Issued in Chinese Patent Application No. 201480048975.X", dated May 3, 2018, 15 Pages.
"Non Final Office Action Issued in U.S. Appl. No. 14/550,123", dated Jul. 27, 2018, 12 Pages.
"First Office Action Issued in Chinese Patent Application No. 201480048969.4", dated Aug. 16, 2018, 14 Pages.
"First Office Action Issued in Chinese Patent Application No. 201480048973.0", dated Jul. 2, 2018, 12 Pages.

* cited by examiner

DATA MODEL INDEXING FOR MODEL QUERIES

CROSS REFERENCES TO RELATED APPLICATIONS

This application is a Continuation of PCT International Application PCT/CN2014/082210 filed Jul. 15, 2014, which is expressly incorporated herein by reference in its entirety.

BACKGROUND

Computing systems and associated networks have revolutionized the way human beings work, play, and communicate. Nearly every aspect of our lives is affected in some way by computing systems. The proliferation of networks has allowed computing systems to share data and communicate thereby vastly increasing information access. For this reason, the present age is often referred to as the "information age".

Data models describe the structure (i.e., the definition, format, relationships, constraints, and so forth) of structured data for storage in data management systems, such as relational databases. During operation, various executing software may reference the data model when determining data to retrieve, the meaning of the data, the relationship of the data with other data, attributes or properties of the data, and so forth.

When designing data systems for an organization, it is common to first design a logical data model that is relatively independent of the underlying data management system (e.g., that is relatively independent of an underlying database management system). The logical data model often includes data objects that are descriptive of business entities. For instance, if the organization was a shaved ice company, the business entities might include shaved ice stands, employees, flavors, sizes, prices, revenue, sales volume, and so forth. Of course, these terms are independent of any underlying physical data management system.

Once the logical data model is designed, the remainder of the data management system is designed to meet the needs of the logical data model. For instance, the physical data model underlies the logical data model, and also describes entities, relationships, attributes, and so forth, but in a manner that more closely aligns to the facilities and constraints of the underlying data management system. Entities and attributes within the logical data model are mapped to entities and attributes within the physical data model.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the use of a data model index for assisting in efficient response to a data model query. The data model query identifies the data model itself and references the schema of the data model, rather than referencing the schema of the underlying data source. The index assists by correlating previous model queries on the data model and associated response to those previous model queries. Accordingly, if a similar model query is encountered, the response from the previous model query may still be considered fresh, the index may be used to more efficiently retrieve the results for the similar model query.

In some embodiments, the data management system may include multiple data models, each having a corresponding data model index. For instance, one data model might be a logical data model, and another might be a physical data model, each data model having its own data model index. There may even be multiple logical data models mapping to a physical data model, and each data model index would again have its own data model index. In some embodiments, a cache may be provided with results from prior model queries.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the use of a data model index for assisting in efficient response to a data model query. The data model query identifies the data model itself and references the schema of the data model, rather than referencing the schema of the underlying data source. The index assists by correlating previous model queries on the data model and associated response to those previous model queries. Accordingly, if a similar model query is encountered, the response from the previous model query may still be considered fresh, the index may be used to more efficiently retrieve the results for the similar model query.

In some embodiments, the data management system may include multiple data models, each having a corresponding data model index. For instance, one data model might be a logical data model, and another might be a physical data model, each data model having its own data model index. There may even be multiple logical data models mapping to a physical data model, and each data model index would again have its own data model index. In some embodiments, a cache may be provided with results from prior model queries.

Some introductory discussion of a computing system will be described with respect to FIG. 1. Then, the structure and use of multiple logical data models to expose a data storage system, and the querying against the same in the context of using data model indexes, will be described with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
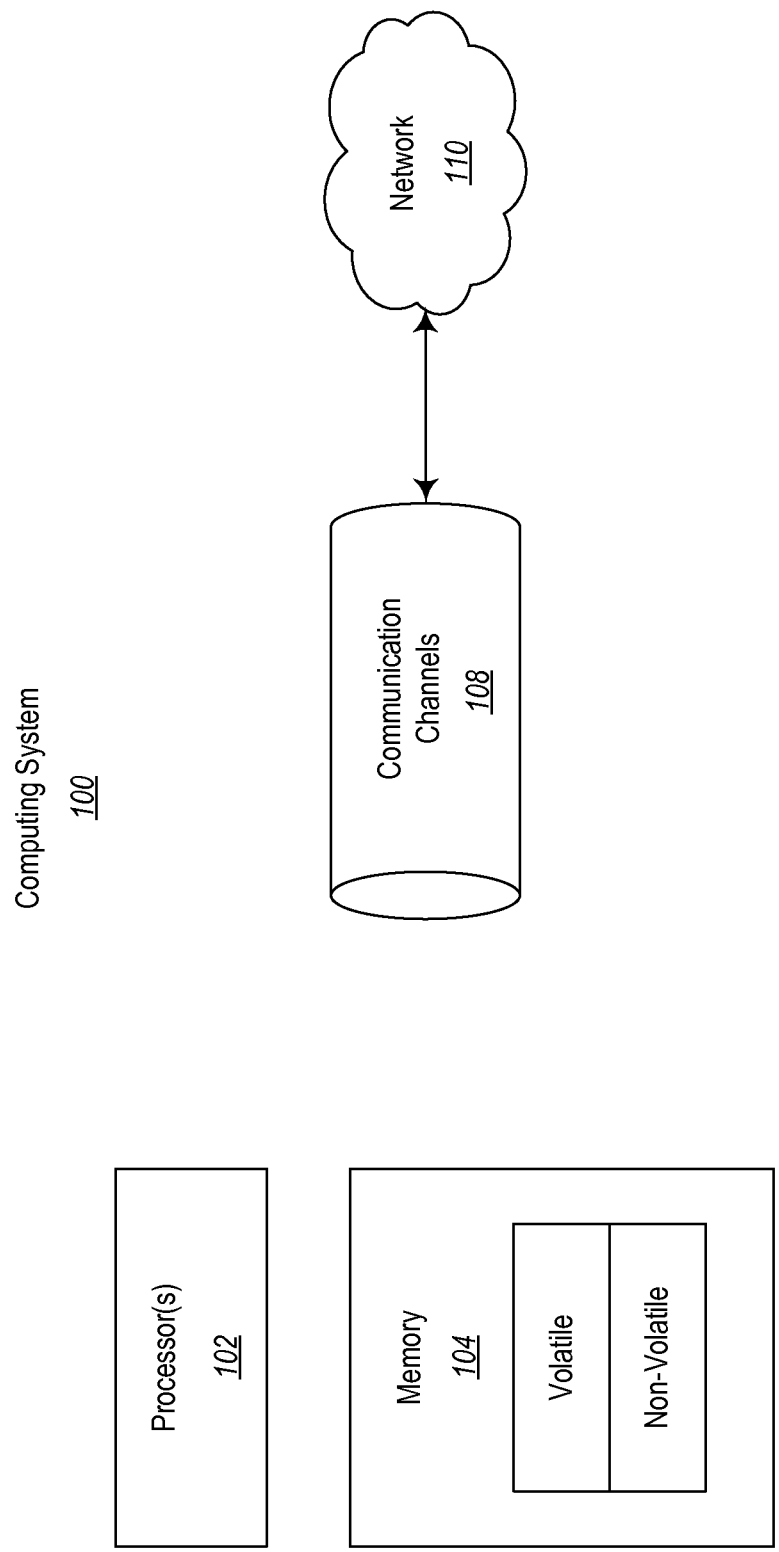
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
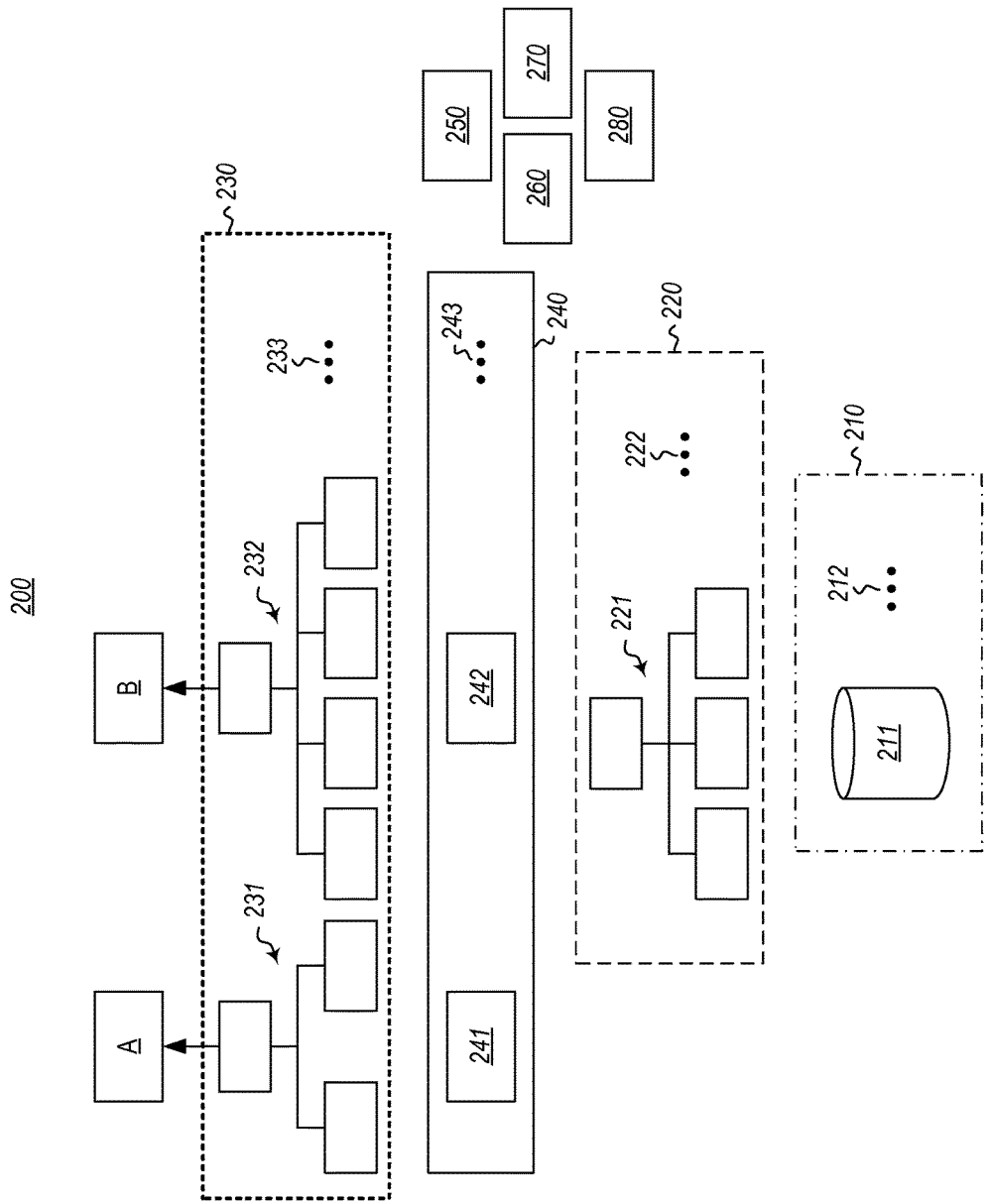
FIG. 2 illustrates a data management environment that includes a data storage system, a physical data model layer, a logical data model layer that includes multiple logical data models, and a mapping layer the intermediates between the physical data model layer and the logical data model layer.

FIG. 2 illustrates a data management environment 200 that includes a data storage system 210 that contains data. The data management environment 200 may be implemented using the computing system 100 of FIG. 1. The data storage system 210 might have a single constituent data storage system 211 (also referred to as a "store"). For instance, a store might be a database or other unified storage. Alternatively, the ellipses 212 represents that there may be multiple stores. For instance, the data storage system 210 might also be a hybrid data storage system in which cases there are multiple stores, at least some of which being of different types. For instance, one of the constituent data storage systems might be structured data, and another of the constituent data storage systems might be unstructured data.

The physical data model level 220 includes zero or more physical data models. For instance, the physical data model level 220 is illustrated as including one physical data model 221, although the ellipses 222 represent that there may be multiple physical data models (or even zero physical data models) within the physical data model level 220. In this description and in the claims, a "physical data model" is a data model that takes into account the facilities and constraints of a specific data management system, such as a database management system. In the case of the data storage system 210 being a hybrid data storage system, there might be multiple physical data models, each taking into account the facilities and constraints of a respective data management system that facilitates the respective constituent data storage system.

Conventionally, there is only one logical data model used to map to a particular physical data model or data storage system. However, in accordance with the principles described herein, there may be multiple logical data models that expose a particular data storage system. Accordingly, the logical data model level 230 is illustrated as including two logical data models 231 and 232 that expose the underlying data storage system 210 (either directly or via one or more of the physical data models in the physical data model layer 220). However, the ellipses 233 symbolically represents that there might be a single logical data model, or potentially three or more logical data models that each expose the data storage system 210.

In this description and in the claims, a "logical data model" is a data model that has at least one set of entities or attributes that is mapped to at least one set of entities or attributes of a physical data model in the physical data model layer 220. In the remainder of this description and in the claims, an "entity" with respect to a data model is either a node in the data model (e.g., an object), or an attribute of a node in the data model (e.g., a property).

The data management environment 200 also includes a mapping layer 240 between the logical data model level 230 and the physical data model level 220. For each of at least some of the logical data models within the logical data model level 230, a semantic mapping set maps sets of one or more entities of the corresponding logical data model in the logical data model level 230 with one or more entities in one or more of the physical data models in the physical data model level 220.

For instance, the semantic mapping set 241 corresponds to the logical data model 231 in that the logical data model 231 uses the semantic mapping set 241 to expose the data storage system 210 (through mapping to one or more entities of one or more of the physical data models in the physical data model layer 220, and/or by direct mapping to one or more entities of the data storage system 210 itself). Likewise, the semantic mapping set 242 corresponds to the logical data model 232 in that the logical data model 232 uses the semantic mapping set 242 to expose the data storage system 210 (either directly, or indirectly via one or more physical data models). The ellipses 243 illustrates that there might be more or less semantic mapping sets related roughly to the number of logical data models in the logical data model layer 230.

Each logical data model may be designed for a different vertical solution (also sometimes referred to as a "domain" or simply as a "vertical"). For instance, the first logical data model 231 is shown as exposing data to a first vertical A, and the second logical data model 232 is shown as exposing data to a second vertical B. Accordingly, different semantics are applied to data for different verticals. For instance, one piece of data may mean different things in different domains. For instance, in the medical domain, a name field have the value "John Doe" might have a slightly different meaning (e.g., a meaning of "patient") that it might in the domain associated with the place where John Doe is employed (in which the same data would have the meaning "employee"). Of course, the terms "patient" and "employee" have significantly different semantics. The semantic mapping sets for each logical data model provides the appropriate mappings to support different semantics being applied to the same data.

The data management environment 200 also includes a common notation component 250 that is configured to allow each logical data model (and semantic mapping sets) to have a different modelling notation. At a higher level, the common notation component 250 allows users to use whatever modelling notation (also called a "representation framework") they desire to access the data via their logical data model. The common notation component 250 does this by translating all or portions of different modelling notations into a common modelling notation for use at the physical data model level 220 and/or at the data storage system 210. Accordingly, any given physical data model may rely on the use of a common modelling notation, regardless of the logical data models that use that physical data model having different modelling notations.

Figure 3:
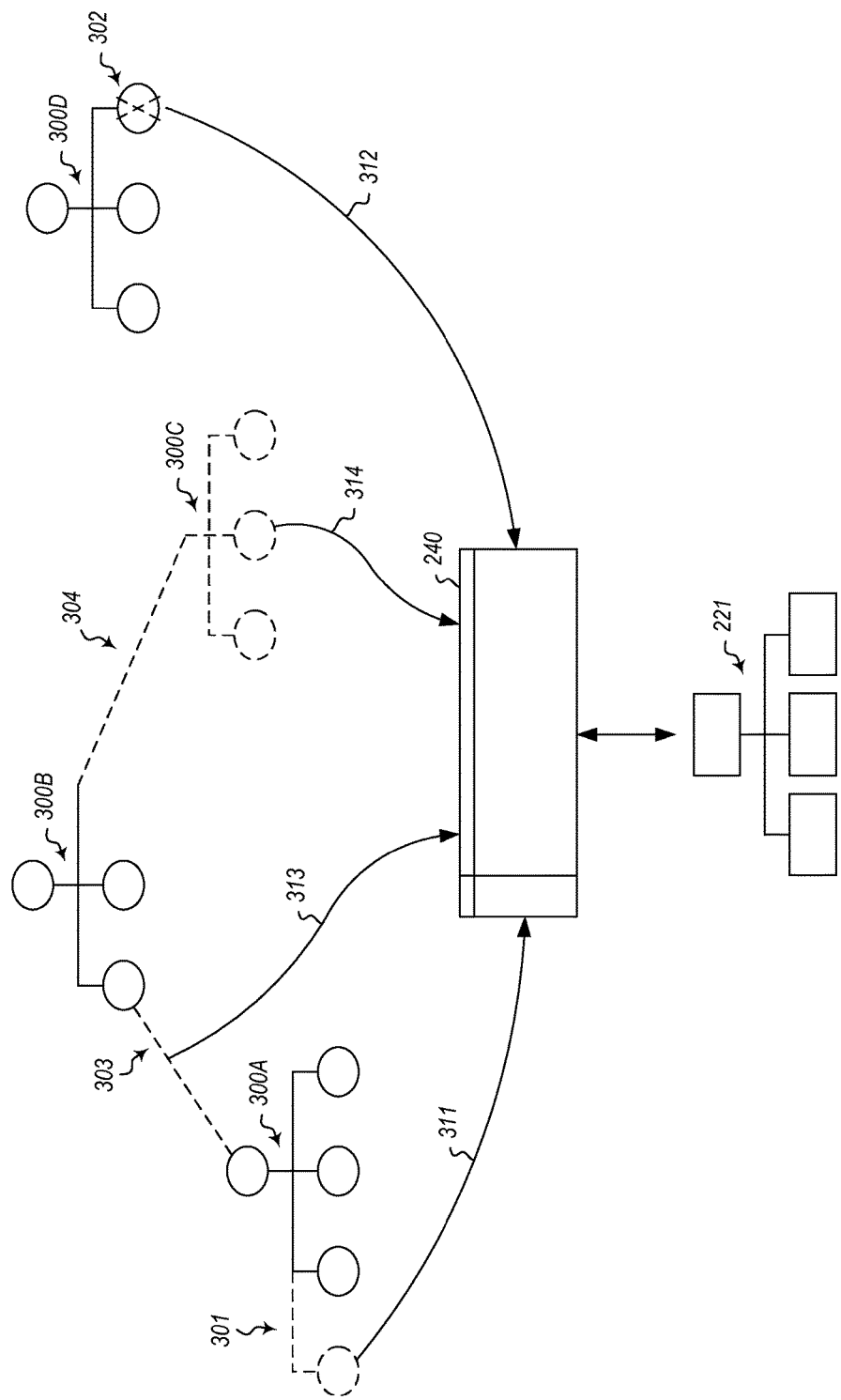
FIG. 3 illustrates examples of four different logical data model structural alteration types performed on example logical data models.

The data management environment 200 also includes a logical data model lifecycle tracking component 260 configured to track logical data model structural alterations of a plurality of logical data model structural alteration types. When a particular alteration of a particular logical data model structural alteration type is performed, the logical data model lifecycle tracking component 260 causes appropriate reflection to be made in the appropriate semantic mapping set(s). For instance, FIG. 3 illustrates four different types of logical data model structural alteration types. In each case, the alteration is represented by dashed lines.

A first logical data model structural alteration type is represented generally by arrow 301 in which a new component entity of a logical data model (in this case logical data model 300A) is created (also referred to as "birth", "propagation" or "enhancement"). The tracking component 260 would thus potentially create (as represented by arrow 311) a representation of the new entity within the semantic mapping set for the logical data model 300A for use in future mapping to corresponding one or more entities in a physical data model 221 within the physical data model level 220 and/or for direct mapping to one or more entities in the data storage system 210.

A second logical data model structural alteration type is represented generally by arrow 302 in which an entity of a logical data model (in this case logical data model 300D) is retired (or removed) from the logical data model. The tracking component 260 would thus remove (as represented by arrow 312) a representation of the retired entity within the semantic mapping set for the logical data model 300D, thus eliminating or rendering moot any mappings involving the retired entity.

A third logical data model structural alteration type is represented generally by arrow 303 in which two logical data models (in this case, logical data models 300A and 300B) are merged into a single data model. The tracking component 260 would thus appropriately merge (as represented by arrow 313) two semantic mapping sets to reflect this merging option.

A fourth logical data model structural alteration type is represented generally by arrow 304 in which one logical data model (in this case, logical data model 300C) is spit from another logic model (in this case, logical data model 300B). The tracking component 260 would thus appropriately split (as represented by arrow 314) a semantic mapping set into two semantic mapping sets to reflect this splitting operation.

Figure 4:
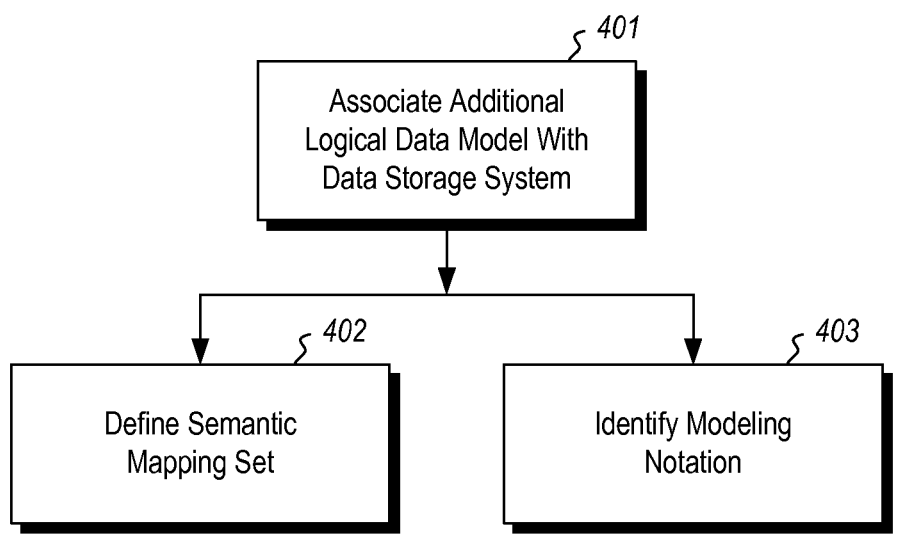
FIG. 4 illustrates a flowchart of a method for augmenting a data model that already includes one or more logical data models that expose a data storage system.

Referring back to FIG. 2, the data management system 200 is also illustrated as including an augmentation component 270, which allows new logical data models to be added to the logical data model level 230. FIG. 4 illustrates a flowchart of a method 400 for augmenting a data management system that includes a one or more logical data models that expose a data storage system with an additional logical data model that also exposes the data storage system. The method 400 might be performed by the augmentation component 270 of FIG. 2.

First, the additional logical data model is associated with a data storage system that already has at least one previous logical data model associated with the data storage system (act 401). For instance, a template for the semantic mapping set might be created for later population. Then, over time, the semantic mapping set is defined for the additional logical data model (act 402) such that the additional logical data model may also expose the data storage system. Note that the semantic mapping sets may be different for each logical data model, and thus this new semantic mapping set may be different than any of the other semantic mapping set(s) used for the other logical data model(s). In addition, the user might specify a modelling notation to use (act 403) either generally when referring to data of the particular additional logical data model, or with respect to using a particular logical data model to reference data.

Accordingly, a data management environment has been described in which a flexible number of logical data models may be used to expose a data storage system. Now, a mechanism for using the data management environment will be described. The primary use for using any data management environment is to perform a query against the data management environment. Thus, this description will now turn to mechanisms for performing queries against the data management environment 200 to thereby have returned data from the data storage system 210.

Figure 5:
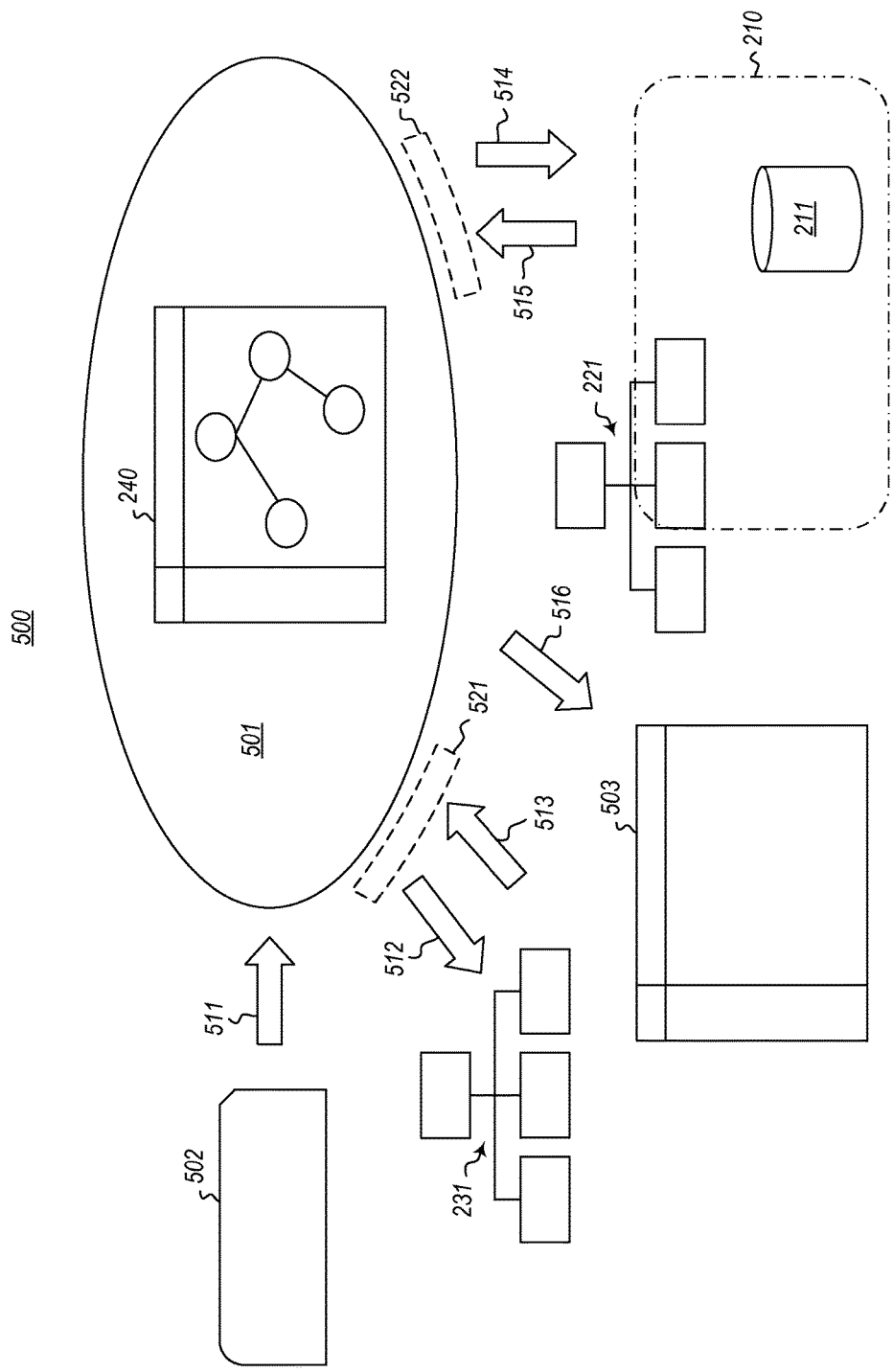
FIG. 5 illustrates a data management environment that is similar to the data management environment of FIG. 2, and in which a model query engine acts as a hub for handling a model query.

The data management environment 200 also includes a model query engine 280. FIG. 5 illustrates a data management environment 500 that is similar to the data management environment 200 of FIG. 2, except that the model query engine 501 is shown as an example of the model query engine 280 of FIG. 2. Furthermore, the model query engine 501 is shown more centrally located acting as a hub for handling model queries. Furthermore, various flows associated with handling a model query are illustrated. In addition, though there may be various logical data models present, only one logical data model 231 is illustrated. Though there may be various physical data models present (or no physical data models present), only one physical data model 221 is illustrated. As the model query engine 501 may use, contain, or be the mapping level 240, the mapping level 240 is also shown as contained within the model query engine 501.

Figure 6:
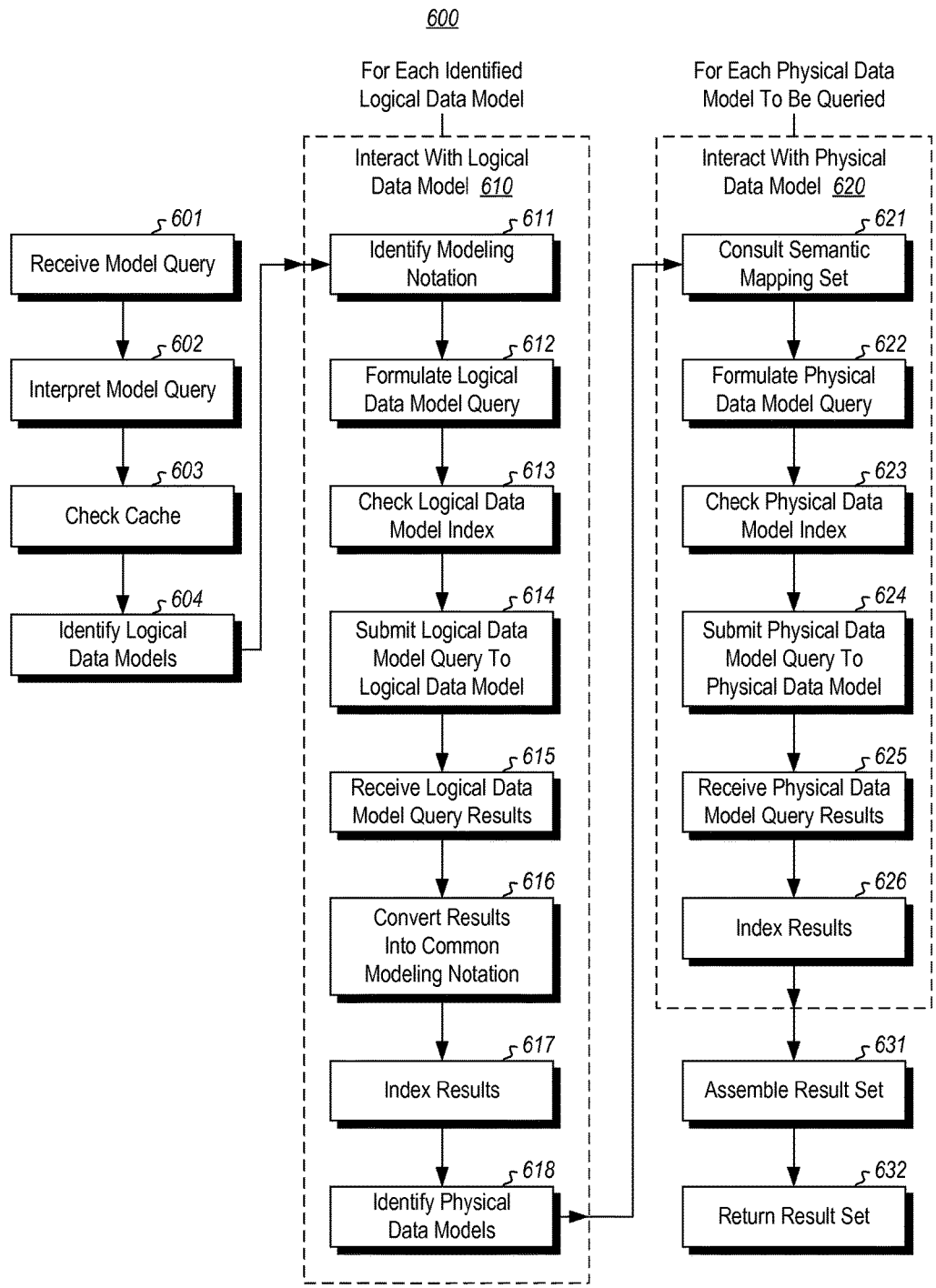
FIG. 6 illustrates a flowchart of a method for a model query engine to operate upon received model queries.

FIG. 6 illustrates a flowchart of a method 600 for a model query engine to operate upon received model queries. The method 600 may be performed by the model query engine 280 of FIG. 2, and/or by the model query engine 501 of FIG. 5. Accordingly, the method 600 will now be described with respect to FIGS. 2 and 5.

The model query engine 280 and/or 501 may perform the method 600 upon receiving a model query. In this description and in the claims, a "model query" is query that specifies a logical data model identity and potentially the identity of one or more logical data model entities (e.g., nodes) and/or the identity of one or more logical data model entity attributes (e.g., properties). Thus, rather than have any awareness about the schema of the underlying data storage system, the user is able to query directly against one or more of the logical data models.

The principles described herein are not limited to any particular format for the model queries. However, the following are examples of generalized model queries, and are provided as they follow similar structure to table-based queries, but are directed towards models, rather than tables:

Example 1

SELECT Attribute(1), Attribute(2), ...
FROM Model(1)

Example 2

SELECT Attribute(1), Attribute(2), ...
FROM Model(1)
WHERE Attribute(1) = '{criteria}'

Example 3

SELECT Model(1).Attribute(1), Model(1).Attribute(2), Model(2).Attribute(1),
...
FROM Model(1) JOIN Model(2)
ON Model(1).Attribute(1), Model(2) Attribute(1)

Example 4

```
SELECT Attribute(1), Attribute(2), ...
FROM Model(1)
UNION {ALL}
SELECT Attribute(1), Attribute(2), ...
FROM Model(2)
```

Thus, the model query language may, but need not, be similar to traditional query language, but refer to logical data model entities and/or attributes, instead of data storage system tables and/or attributes. For instance, the model query language may have provisions for set expressions (such as "UNION", "JOIN", "DIFFERENCE", "INTERSECTION" and the like). Each of the model queries might have a common schema across all of the plurality of logical data models. Thus, the querier need not have any knowledge at all about the data storage system in order to generate a model query, but instead just reference logical data models, logical data model entities and/or logical data model entity attributes, and as appropriate, apply constraints, set expressions, and the like to the model query. If, however, the querier is familiar with the modelling notation of a particular logical data model, the querier might still generate a logical data model query directly against that logical data model using that modelling notation.

The model query engine receives the generated model query (act 601). For instance, in FIG. 5, the model query engine 501 receives a model query 502 (as represented by arrow 511).

The model query engine then interprets the model query (act 602). The model query engine may then check a cache (act 603) to see if all or parts of the same model query have been made in the past and recently enough that the associated results in the cache may be considered fresh.

Figure 7:
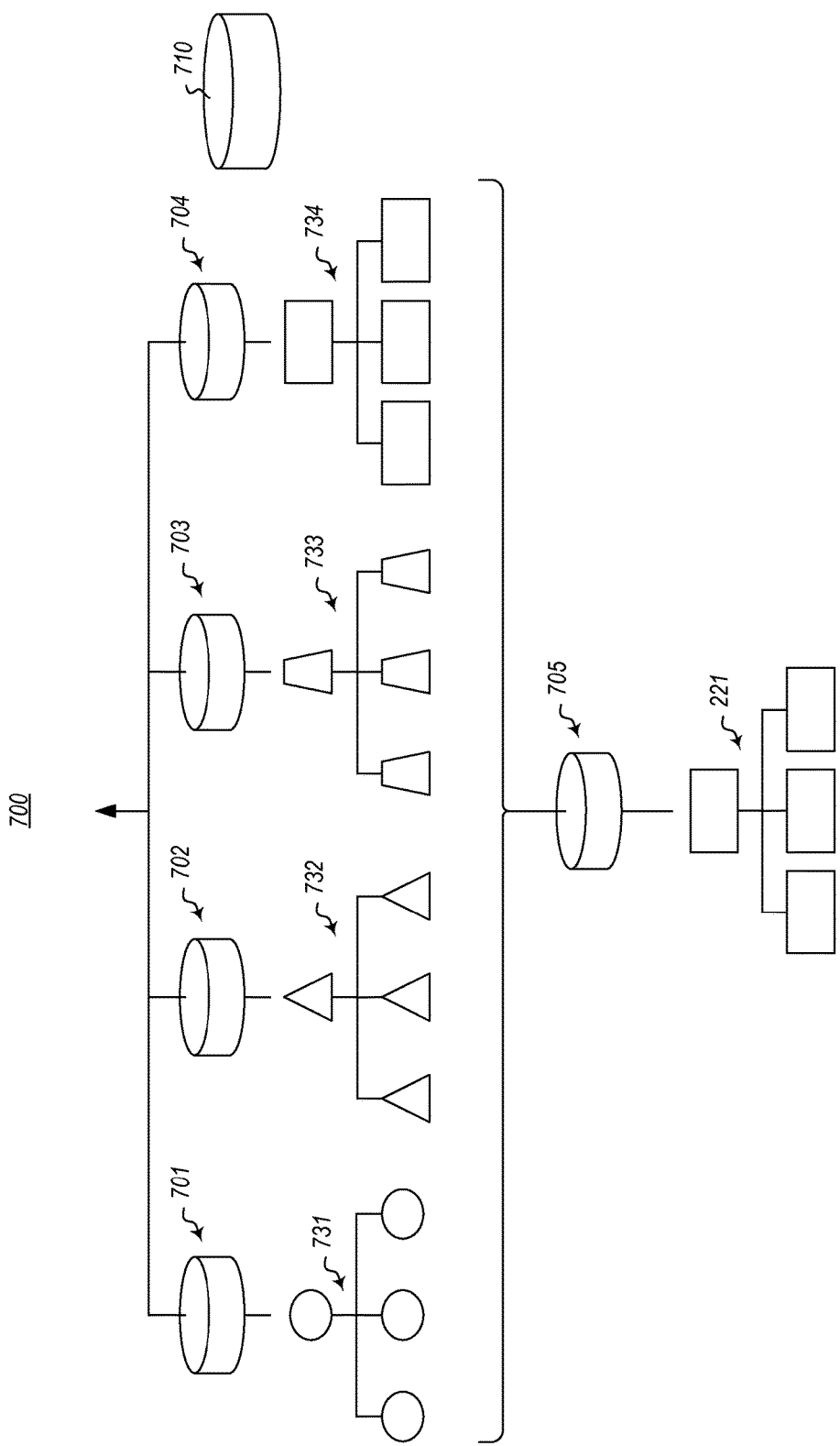
FIG. 7 illustrates a data management environment that is similar to that of FIG. 2, except that additional logical data models are illustrated, each of the logical and physical data models have an associated index, and there is a cache for model queries.

For instance, FIG. 7 illustrates a data management environment 700 that is similar to the data management environment 200 of FIG. 2. Here, however, there are four logical data models 731 through 734 illustrated. Accordingly, logical data models 731 and 732 might represent examples of the logical data models 231 and 232 of FIG. 2. The logical data models 733 and 734 might represent by the ellipses 233 in FIG. 3. Each logical data model is illustrated as having different shaped elements, which symbolically represents that the logical data models may each be represented by different modelling notation. There is a cache 710 illustrated where results of previously made model queries (or portions of such query results) are kept at least until such results are no longer considered fresh. The model query engine 501 of FIG. 5 may thus consult with the cache 710 to see if part or all of the model query already has fresh results within the cache 710.

The model query engine then identifies one or more logical data models identified in the query (act 604). For instance, in the example of FIG. 5, suppose that the only logical data model identified is the logical data model 231. Interpretation of the model query also involves identifying any logical data model entities and/or attributes specified in the model query.

For each of the identified logical data models, the model query engine interacts with the identified logical data model(s) (act 610). In the example of FIG. 5, there was only one logical data model 231 identified in the model query, and thus the model query engine 501 interacts with the logical data model 231 over the appropriate channel as represented by arrows 512 and 513.

As part of this interaction, the model query engine 501 identifies a modelling notation used by the logical data model (act 611). For instance, the logical data model provider may have specified this modelling notation in act 403 of FIG. 4. Alternatively or in addition, the model query engine 501 may automatically detect the modelling notation used by the logical data model.

The model query engine 501 then formulates a logical data model query (act 612) that complies with the modelling notation for the logical data model and that corresponds to that portion of the model query that corresponds to the specific logical data model.

The model query engine 501 may then check an index associated with the logical data model (act 613), to see if the results of that query have previously been returned and/or if there are indices that will assist with simplifying the interaction with the logical data model. In one example, each logical data model has an associated distinct index. For instance, in the example of FIG. 7, note that each of the logical data models 731 through 734 have an associated index 701 through 704. In the example of FIG. 5, since there is only one logical model 231 being interacted with, only the associated logical data model index 521 is shown. For instance, if the logical data model 231 of FIG. 5 were the logical data model 731 of FIG. 7, the logical data model index 521 of FIG. 5 would be the logical data model index 701 of FIG. 7. Accordingly, the principles described herein may be expedited by used of a multi-model index.

If necessary (because the results of the logical data model query are not completely cached in the index), the model query engine 501 then submits (act 614) the logical data model query (or a simplified version of the logical data model query permitted by the index for that logical data model) to the corresponding logical data model. This submission is represented by arrow 512 in FIG. 2.

Whether from the index for the logical data model, or from concurrent interaction with the logical data model, the model query engine 501 receives results of the logical data model query (act 615) from the corresponding logical data model. This receipt of logical date model query results is represented in FIG. 5 by the arrow 513 in FIG. 5.

The model query engine then converts these results from the modelling notation used by the logical data model into a common modelling notation (act 616), if the modelling notation of the logical data model is not already the common modelling notation. An example of the common modelling notation is the Uniformed Modelling Language (UML), although this is just an example. Accordingly, when interacting with the physical data model(s), the model query engine may use the common modelling notation, while still allowing the providers of the logical data models to specify the modelling notation to be used when referencing the respective logical data model.

The results of this logical data model query may potentially be indexed (act 617) in the index of the corresponding logical data model. For instance, in FIG. 5, the results returned (as represented by arrow 513) from the logical data model 231 might be indexed within the corresponding index 521 for the logical data model 231. Referring to FIG. 7, each of the logical model indexes 701 through 704 may likewise index results of previous model queries made to respective logical data models 731 through 734.

Based on the results, the model query engine also identifies (act 618) one or more physical data models (or the data storage system directly) that are to be interacted with in order to respond to the model query. To do so, the model query engine might reference the semantic mapping set for the corresponding logical data model from which the results were obtained.

Then, the model query engine interacts with each of the resulting one or more physical data models (act 620). Accordingly, the contents of act 620 are performed for each of one or more physical data models, or for the data storage system directly, as the mappings might direct. In the remaining description of the content of act 620, the term "physical data model" will be used interchangeably with the data source system, since the contents of act 620 may be performed to interact with either a particular physical data model that operates above the data source system, or directly with the data source system itself.

To do so, the model query engine 501 consults the semantic mapping set for the logical data model (act 621). Using this consultation, and the results of the logical data model queries, the model query engine 501 then formulates a physical data model query (act 622) that complies with the common modelling notation used at the physical data model layer (or by the data source system itself).

The model query engine 501 may then check an index associated with the physical data model (act 623), to see if the results of that query have previously been returned and/or if there are indices that will assist with simplifying the interaction with the physical data model (or by the data source system as the case may be). For instance, in FIG. 5, the physical data model index 522 serves the physical data model 221. For instance, in FIG. 7, this physical data model index 705 is also illustrated.

If necessary (because the results of the physical data model query are not completely cached in the index 522), the model query engine 501 then submits (act 624) the physical data model query (or a simplified version of the physical data model query permitted by the index for that physical data model) to the corresponding physical data model. This submission is represented by arrow 524 in FIG. 5.

Whether from the index 522 for the physical data model, or from concurrent interaction with the physical data model 221, the model query engine 501 receives results of the physical data model query (act 625) from the corresponding physical data model. This receipt of physical date model query results is represented in FIG. 5 by the arrow 515.

The results of this physical data model query may potentially be indexed (act 626) in the index of the corresponding physical data model. For instance, in FIG. 5, the results returned (as represented by arrow 515) from the physical data model 221 might be indexed within the corresponding index 522 for the physical data model 221. In the context of FIG. 7, the results might be indexed in the physical data model index 705.

The model query engine then assembles all of the physical data model query results into a result set (act 631) and returns the result set to the querier (act 632). This return of the result set is represented in FIG. 5 using arrow 516. The result set is represented by element 503 in FIG. 5.

The principles described herein may be particularly useful for enormous volumes of data that potentially change over time (sometimes referred to as "big data"). Such data is not often spoken about in terms of Terabytes, but often in terms of petabytes (1024 terabytes), exabytes (1024 petabytes), and in the future perhaps zettabytes (1024 exabytes) and yottabytes (1024 zettabytes). Such data is often more global and distributed in nature, and involves numerous data sources, often being changed, added, and replaced dynamically. Thus, "big data" may be viewed as more of an organic and evolving data source system.

With big data, it may be quite beneficial to have multiple vertical solutions using that kind of volume of data, since such big data represents a valuable resource to many organizations. Furthermore, since the data is so large, it is helpful to perform queries on the data by referencing the logical data model that the particular vertical solution is familiar with, rather than referencing the schema of the data source directly. Accordingly, the principles described herein allow multiple vertical solutions to use distinct logical data models to access the same data, and allow them to query on that same big data, even though the querier is unfamiliar with the complexities of the underlying schema of the data source itself.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
   one or more processors; and
   one or more hardware storage devices having stored thereon computer-executable instructions that are executable by the one or more processors to cause the computer system to:
   identify a plurality of logical data models that each corresponds to a physical data model, wherein each given logical data model of the plurality of logical data models includes a logical data model index corresponding to the given logical data model that is configured to index a plurality of queries and at least partial query results corresponding to each of the plurality of queries, the indexed queries comprising queries issued to the given logical data model, and wherein each logical data model of the plurality of logical data models includes a different semantic mapping set that maps at least one logical data model entity to at least one entity of the physical data model;
   receive a model query that identifies a particular logical data model of the plurality of logical data models; and
   in response to the received model query, access the logical data model index corresponding to the particular logical data model to determine whether results of the model query have been previously returned.

2. The system in accordance with claim 1, wherein the system includes a cache configured to cache results of at least some model queries previously made to any of the plurality of logical data models.

3. The system in accordance with claim 1, wherein the particular logical data model is mapped to a single physical data model.

4. The system in accordance with claim 3, wherein the system includes a cache configured to cache results of at least some model queries previously made to any of the plurality of logical data models.

5. The system in accordance with claim 1, wherein a same model query is used for querying each of the plurality of logical data models.

6. A method for responding to a model query to a data model, the method comprising:

identifying a plurality of logical data models that each corresponds to a physical data model, wherein each given logical data model of the plurality of logical data models includes a logical data model index corresponding to the given logical data model that is configured to index a plurality of queries and at least partial query results corresponding to each of the plurality of queries, the indexed queries comprising queries issued to the given logical data model, and wherein each logical data model of the plurality of logical data models includes a different semantic mapping set that maps at least one logical data model entity to at least one entity of the physical data model;

receiving a model query that identifies a particular logical data model of the plurality of logical data models; and in response to the received model query, accessing the logical data model index corresponding to the particular logical data model to determine whether results of the model query have been previously returned.

7. The method in accordance with claim 6, wherein the system includes a cache configured to cache results of at least some model queries previously made to any of the plurality of logical data models.

8. The method in accordance with claim 6, wherein the particular logical data model is mapped to a single physical data model.

9. The method in accordance with claim 6, wherein a same model query is used for querying each of the plurality of logical data models.

10. A computer program product comprising one or more hardware storage devices having thereon computer-executable instructions that are structured such that, when executed by one or more processors of a computing system, cause the computing system to:

identify a plurality of logical data models that each corresponds to a physical data model, wherein each given logical data model of the plurality of logical data models includes a logical data model index corresponding to the given logical data model that is configured to index a plurality of queries and at least partial query results corresponding to each of the plurality of queries, the indexed queries comprising queries issued to the given logical data model, and wherein each logical data model of the plurality of logical data models includes a different semantic mapping set that maps at least one logical data model entity to at least one entity of the physical data model;

receive a model query that identifies a particular logical data model of the plurality of logical data models; and in response to the received model query, access the logical data model index corresponding to the particular logical data model to determine whether results of the model query have been previously returned.

11. The computer program product in accordance with claim 10, wherein the computing system includes a cache configured to cache results of at least some model queries previously made to any of the plurality of logical data models.

12. The computer program product in accordance with claim 10, wherein the particular logical data model is mapped to a single physical data model.

13. The computer program product in accordance with claim 12, wherein the computing system includes a cache configured to cache results of at least some model queries previously made to any of the plurality of logical data models.

14. The computer program product in accordance with claim 10, wherein a same model query is used for querying each of the plurality of logical data models.

* * * * *